(12) United States Patent
O'Neall et al.

(10) Patent No.: US 7,086,342 B2
(45) Date of Patent: Aug. 8, 2006

(54) STANDARDIZED RECEIVER FOR BULK SEED CONTAINERS

(75) Inventors: Donald L. O'Neall, Downs, IL (US); Richard L. Follmer, Hudson, IL (US)

(73) Assignee: Great Plains Manufacturing Incorporated, Salina, KS (US)

(*) Notice: Subject to any disclaimer, the term of this patent is extended or adjusted under 35 U.S.C. 154(b) by 38 days.

(21) Appl. No.: 10/456,304

(22) Filed: Jun. 6, 2003

(65) Prior Publication Data

US 2003/0226484 A1 Dec. 11, 2003

Related U.S. Application Data

(60) Provisional application No. 60/387,099, filed on Jun. 7, 2002.

(51) Int. Cl.
*A01C 7/00* (2006.01)
*A01C 9/00* (2006.01)

(52) U.S. Cl. .................. 111/174; 111/200; 111/900; 111/925

(58) Field of Classification Search .................. 111/59, 111/62, 63, 174, 925, 118, 129, 200, 900
See application file for complete search history.

(56) References Cited

U.S. PATENT DOCUMENTS

| | | | | |
|---|---|---|---|---|
| 2,415,934 A | * | 2/1947 | Buehler | 111/200 |
| 3,526,342 A | * | 9/1970 | Pechacek | 222/610 |
| 3,683,829 A | * | 8/1972 | Herrett | 111/200 |
| 4,715,515 A | * | 12/1987 | Steilen | 222/143 |

(Continued)

OTHER PUBLICATIONS

"System One" product description, available at www.yetterco.com (date unknown).*

(Continued)

*Primary Examiner*—Christopher J. Novosad
(74) *Attorney, Agent, or Firm*—Hovey Williams LLP

(57) ABSTRACT

A standardized receiver for bulk materials containers such as seeds for the quick and efficient loading of seed into a planter with bulk handling capability. Delivery mechanism associated with the receiver is disposed to accept materials discharged from the container after it has been placed on the planter frame and to transport such materials to the opener rows. A manifold of the mechanism is fitted with output pipe fixtures for the discharge of the seed to individual rows via flexible hose. The inlet of the manifold is on the top surface of the structure and aligned with the slidegate opening of the shipping container. Air pressure is created within the manifold by a fan assembly. Airflow exiting the manifold carries seed through the pipe fittings, into the hoses and on to the planter rows. The receiver mounts to the planter frame above the mechanism. The receiver conforms to the general dimensions of the bottom of a shipping container. The frame of the receiver is of suffecient integrity to support the weight of a loaded container as the planter is drawn over a tract of land. The receiver frame is fitted with appropriate guides to insure proper alignment as the container is loaded and unloaded from the receiver frame. Once loaded onto the receiver frame, the slidegate is opened to discharge the contents of the container into the mechanism.

11 Claims, 6 Drawing Sheets

U.S. PATENT DOCUMENTS

| | | | |
|---|---|---|---|
| 5,465,829 A * | 11/1995 | Kruse | 198/538 |
| 5,785,481 A * | 7/1998 | Ockels | 414/523 |
| 5,845,799 A | 12/1998 | Deaton | |
| 6,010,022 A | 1/2000 | Deaton | |
| 6,092,974 A * | 7/2000 | Roth | 414/526 |
| 6,308,645 B1 | 10/2001 | Newkirk et al. | |
| 6,584,919 B1 * | 7/2003 | McQuinn | 111/118 |
| 6,672,229 B1 * | 1/2004 | Lee et al. | 111/200 |
| 6,708,631 B1 * | 3/2004 | McQuinn et al. | 111/174 |
| 6,772,702 B1 * | 8/2004 | Lee et al. | 111/174 |
| 2003/0177965 A1 * | 9/2003 | Lee et al. | 111/170 |
| 2004/0016378 A1 * | 1/2004 | Powell et al. | 111/200 |

OTHER PUBLICATIONS

"Editor's New Product Picks", Successful Farming Online, Jan. 1, 1999.*

* cited by examiner

STANDARDIZED RECEIVER FOR BULK SEED CONTAINERS

RELATED APPLICATIONS

This application claims the priority benefit of provisional patent application No. 60/387,099 filed Jun. 7, 2002, said provisional application being hereby incorporated by reference into the present specification.

TECHNICAL FIELD

The present invention relates generally to bulk seed systems and more specifically it relates to a standardized receiver for bulk seed containers for the quick and efficient loading of seed into a planter with bulk handling capability.

BACKGROUND AND SUMMARY

It can be appreciated that bulk seed systems have been in use for years. Typically, bulk seed systems comprised of planting machines, such as row-crop planters and grain drills, are widely used in the agricultural industry to provide a mechanized and quick manner of dispensing seeds, grain and the like material over a tract of land. Such machines generally are provided with a plurality of dispensing units carried on a single frame for simultaneously dispensing the material over a plurality of uniform rows. Conventional planters without bulk seed, but with individual row hoppers, require seed to be placed into the hopper in limited amounts due to the inherent capacity limitations of the hopper. If all rows are to empty out at the same point in the field, then an equal amount of seed must be added to each individual hopper. As planter sizes have increased over the years, the inconvenience of adding seed to the hoppers in equal amounts creates an additional burden for the operator. As the planter empties out, some rows may run out of seed before others and the seed must be redistributed from row to row to use up all of the seed. This is time-consuming, when planting time is most valuable.

Conventional bulk seed systems require filling the seed hopper from some other container or package. The existing products must be filled using conventional bags (30#–60# paper bags) or some type of conveyer, auger or bulk transfer mechanism. Another problem with conventional bulk seed systems are once the bulk system has been filled, the contents must be planted or somehow removed or drained out to reduce the weight of the planter for transport or seed variety change. The process of refilling is both inconvenient and time-consuming. Most conventional bulk seed systems require a pressurized container. Other bulk systems require mechanically complex systems of tubes and augers, which may lead to seed damage from mechanical handling and abrasion.

In these respects, the standardized receiver for bulk seed containers according to the present invention substantially departs from the conventional concepts and designs of the prior art, and in so doing provides an apparatus primarily developed for the purpose of the quick and efficient loading of materials such as seeds into a planter with bulk handling capability.

In view of the foregoing disadvantages inherent in the known types of bulk seed systems now present in the prior art, the present invention provides a new standardized receiver for bulk seed containers and the like wherein the same can be utilized for the quick and efficient loading of seed into a planter with bulk handling capability.

The general purpose of the present invention, which will be described subsequently in greater detail, is to provide a new standardized receiver for bulk seed containers that has many of the advantages of the bulk seed systems mentioned heretofore and many novel features that result in a new standardized receiver for bulk seed containers which is not anticipated, rendered obvious, suggested, or even implied by any of the prior art bulk seed systems, either alone or in any combination thereof.

To attain this, the present invention generally comprises a standardized receiver, a frame with a load-carrying capacity consistent with the weight of a loaded shipping container, and mechanism for distributing materials such as seeds to openers of the machine. The mechanism includes a manifold fitted with output pipe fixtures for the discharge of the seed to individual rows via flexible hose. The inlet of the manifold is on the top surface of the structure and aligned with the slidegate opening of the shipping container. Air pressure is created within the mechanism by a fan assembly. Airflow exiting the manifold carries seed from the manifold through pipe fittings, conduits, or hoses on to the planter rows. The receiver frame mounts to the planter frame above the mechanism. The receiver conforms to the general dimensions of the bottom of a shipping container. Appropriate constraints align the shipping container slidegate to discharge the contents of the shipping container directly into the inlet of the mechanism. The frame of the receiver is of sufficient integrity to support the weight of a loaded container as the planter is drawn over a tract of land. The receiver frame is fitted with appropriate guides to insure proper alignment as the container is loaded and unloaded from the receiver frame. A standardized shipping container rests on the receiver frame. A container is typically of sufficient strength and volume to carry seed to the planter. Once loaded onto the receiver frame, the slidegate is opened to discharge the contents of the container into the mechanism.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a standardized receiver for bulk materials containers such as seeds that will overcome the shortcomings of the prior art devices.

An object of the present invention is to provide a standardized receiver for bulk seed containers for the quick and efficient loading of seed into a planter with bulk handling capability.

Another object is to provide a standardized receiver for bulk seed containers that does not require a pressurized container.

Another object is to provide a standardized receiver for bulk seed containers that utilizes a standardized seed shipping container already in use in the industry. The seed industry has made a substantial commitment to bulk seed handling and will continue to do so in the future.

Another object is to provide a standardized receiver for bulk seed containers that can serve as the seed hopper on the planter, and will allow for seeding directly from the shipping container.

Another object is to provide a standardized receiver for bulk seed containers that can be removed from the planter with the contents (seed) still intact with no compromise in the quality or integrity of the seed.

Another object is to provide a standardized receiver for bulk seed containers that can receive a fully loaded shipping container, with the contents sealed, or can receive seed from individual paper bags, which can be emptied into the standardized container one at a time.

Another object is to provide a standardized receiver for bulk seed containers wherein the contents from a container are evenly distributed to all the rows on the planter for uniform planting and distribution.

Another object is to provide a standardized receiver for bulk seed containers that can receive containers, conforming to certain dimensions, from different manufacturers.

Another object is to provide a means for quick and efficient cleanout when changing varieties by using the air system to blow out seed remaining in the system after the seed load has been planted out.

Another object is to provide a means for splitting the distributing hoses with a "Y" at the terminal end to multiply the number of rows serviced from a given manifold configuration.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the invention becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
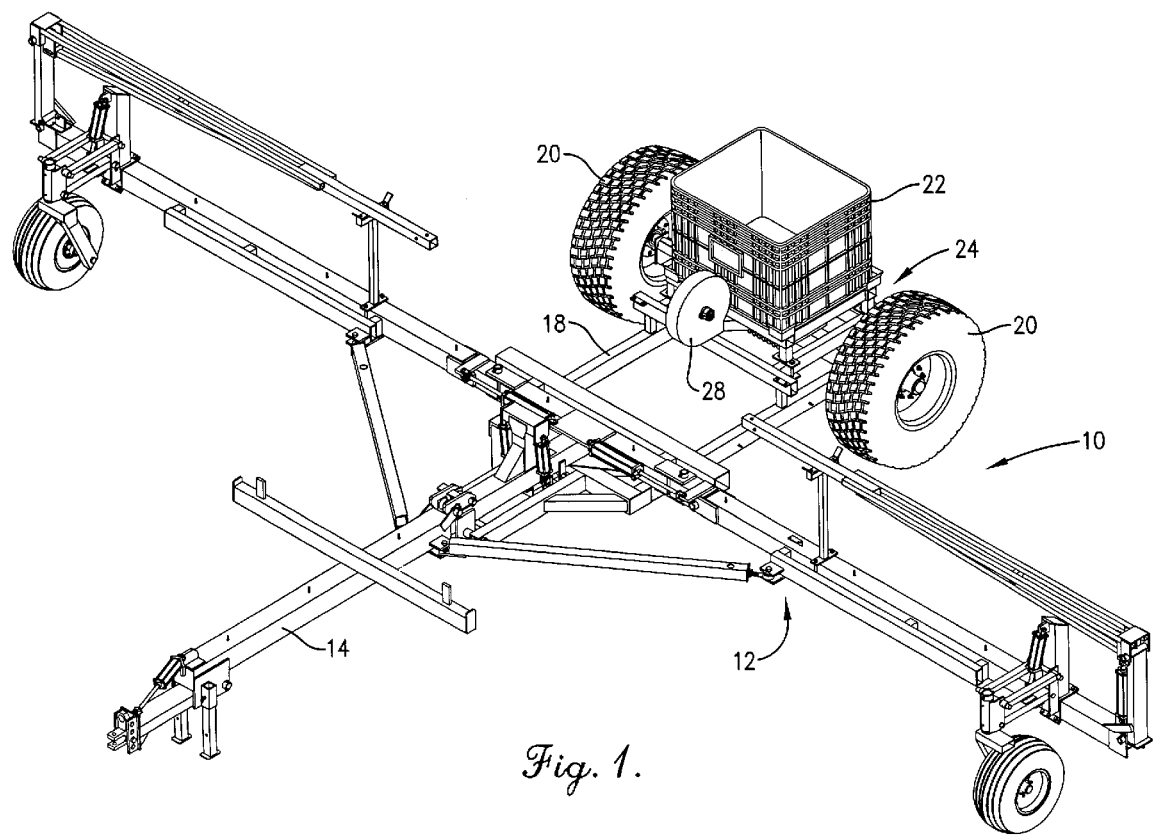
FIG. 1 is a top, front isometric view of a planter employing the principles of the present invention.
Figure 2:
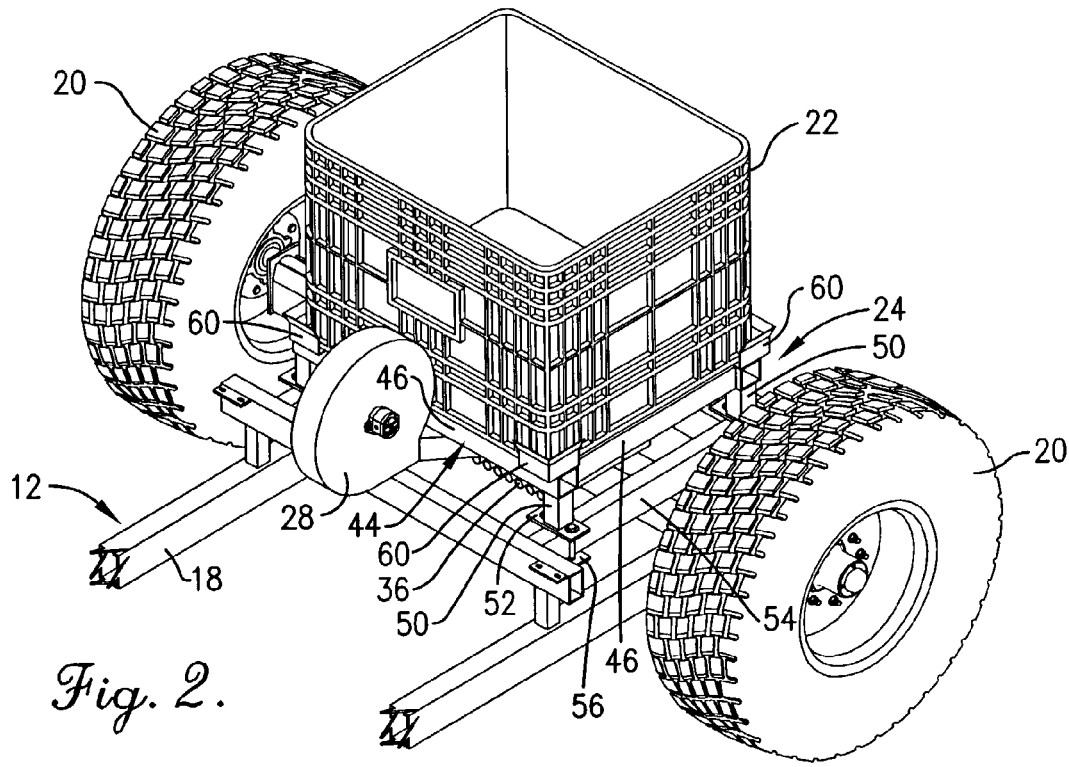
FIG. 2 is an enlarged, fragmentary, front isometric view thereof.
Figure 3:
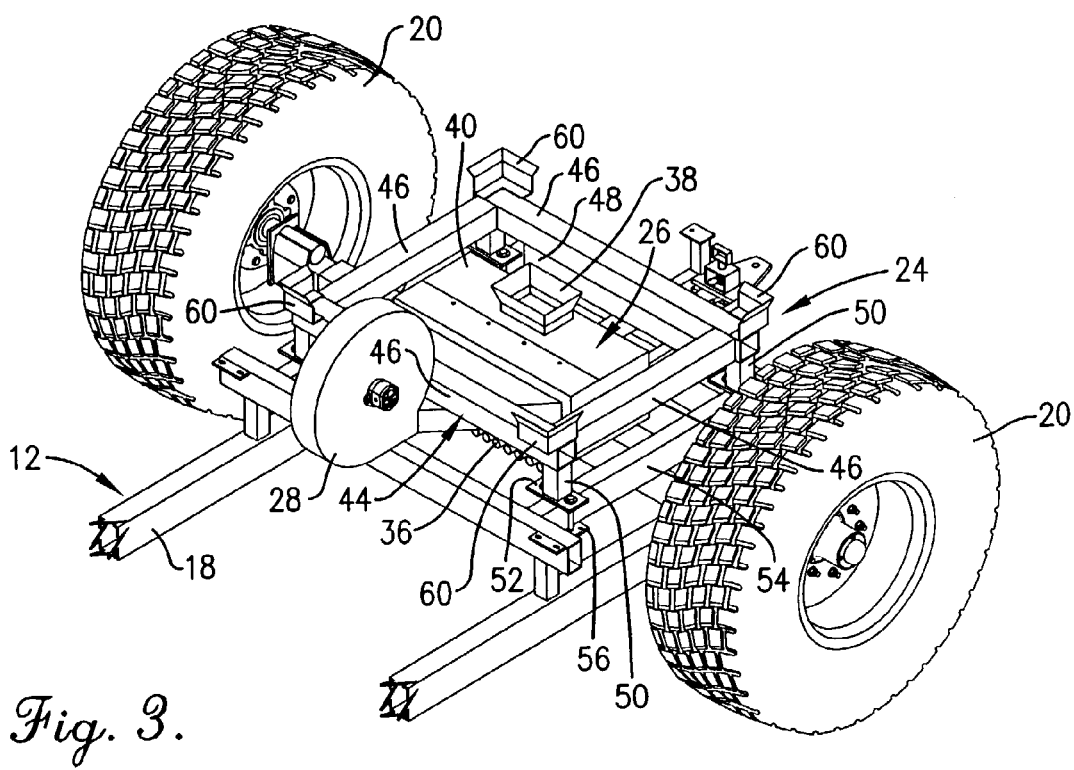
FIG. 3 is an enlarged, fragmentary, front isometric view of the planter with the bulk seed container removed to reveal details of construction.
Figure 4:
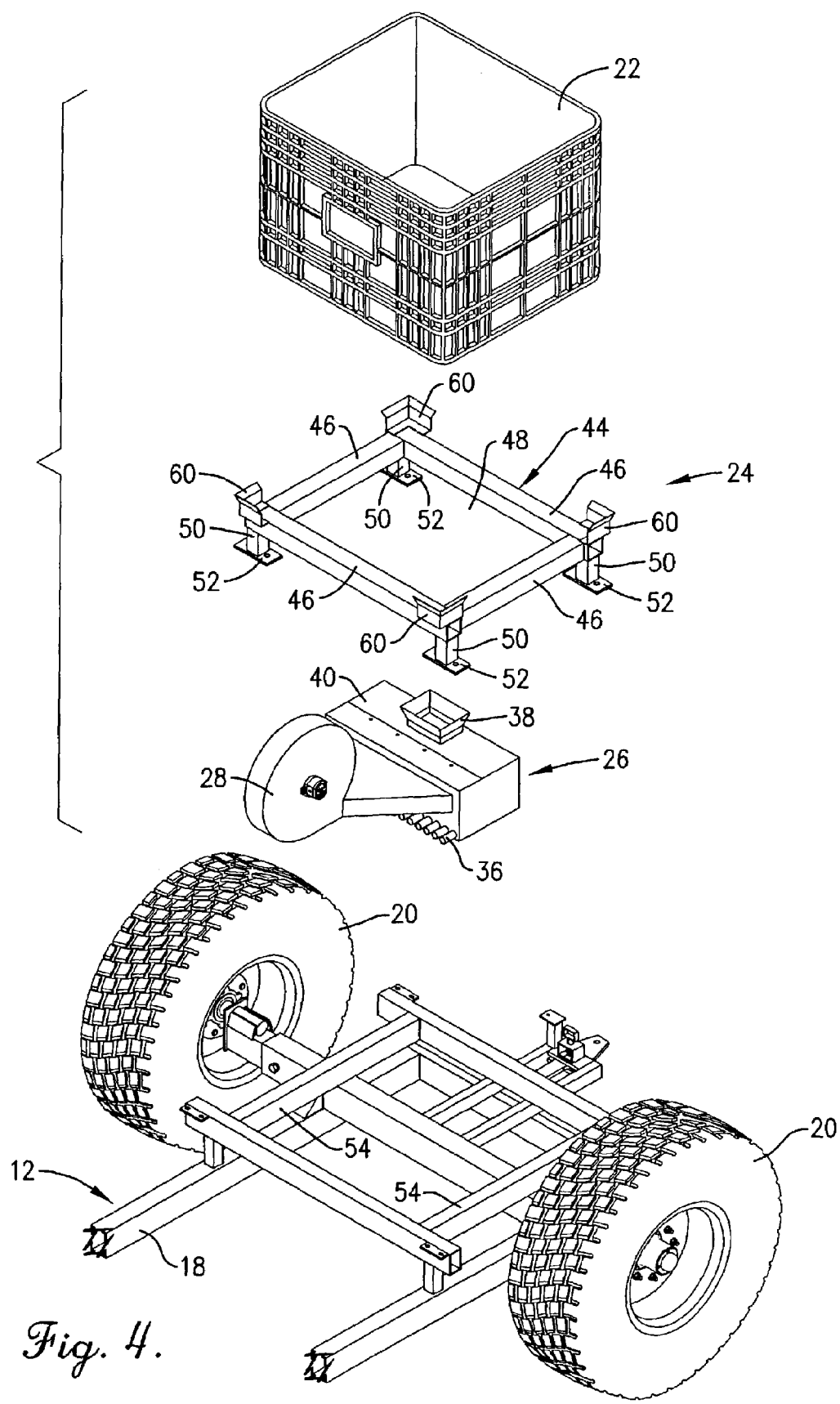
FIG. 4 is an enlarged, fragmentary, front exploded isometric view of the planter.
Figure 5:
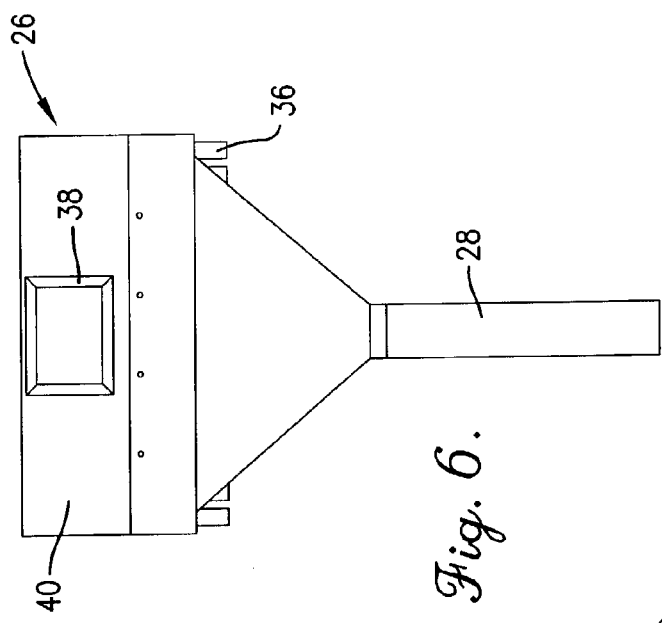
FIG. 5 is an enlarged, front isometric view of the mechanism for delivering seeds to the openers.
Figure 6:
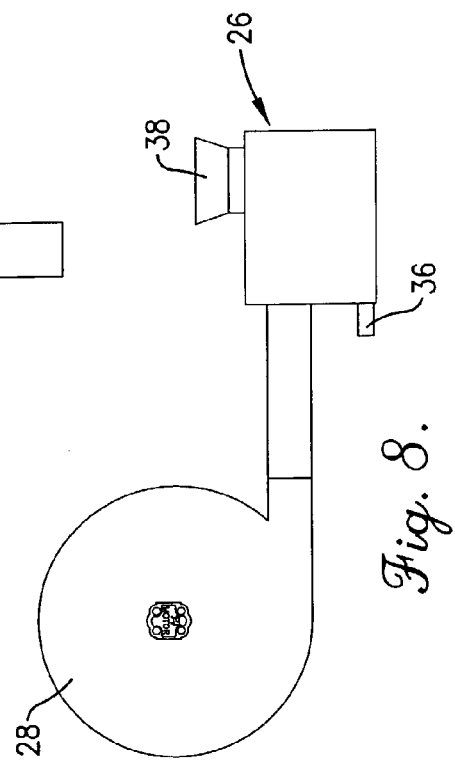
FIG. 6 is a top plan view thereof.
Figure 7:
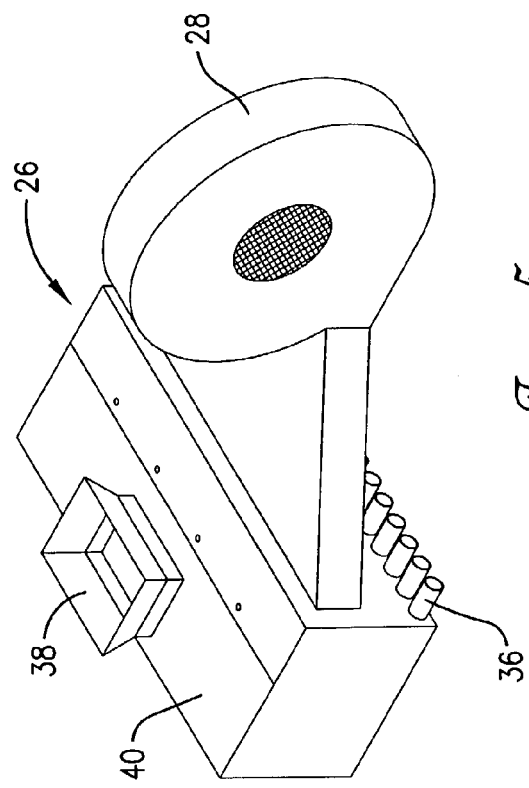
FIG. 7 is a front elevational view thereof.
Figure 8:
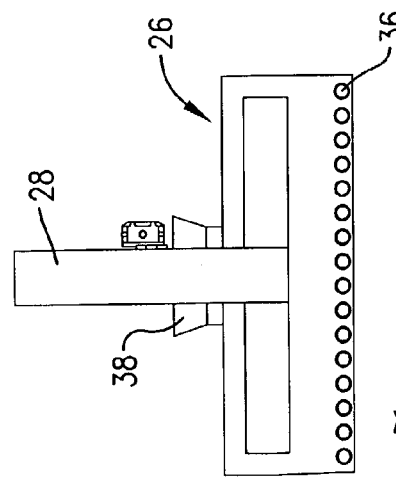
FIG. 8 is a side elevational view thereof.
Figure 10:
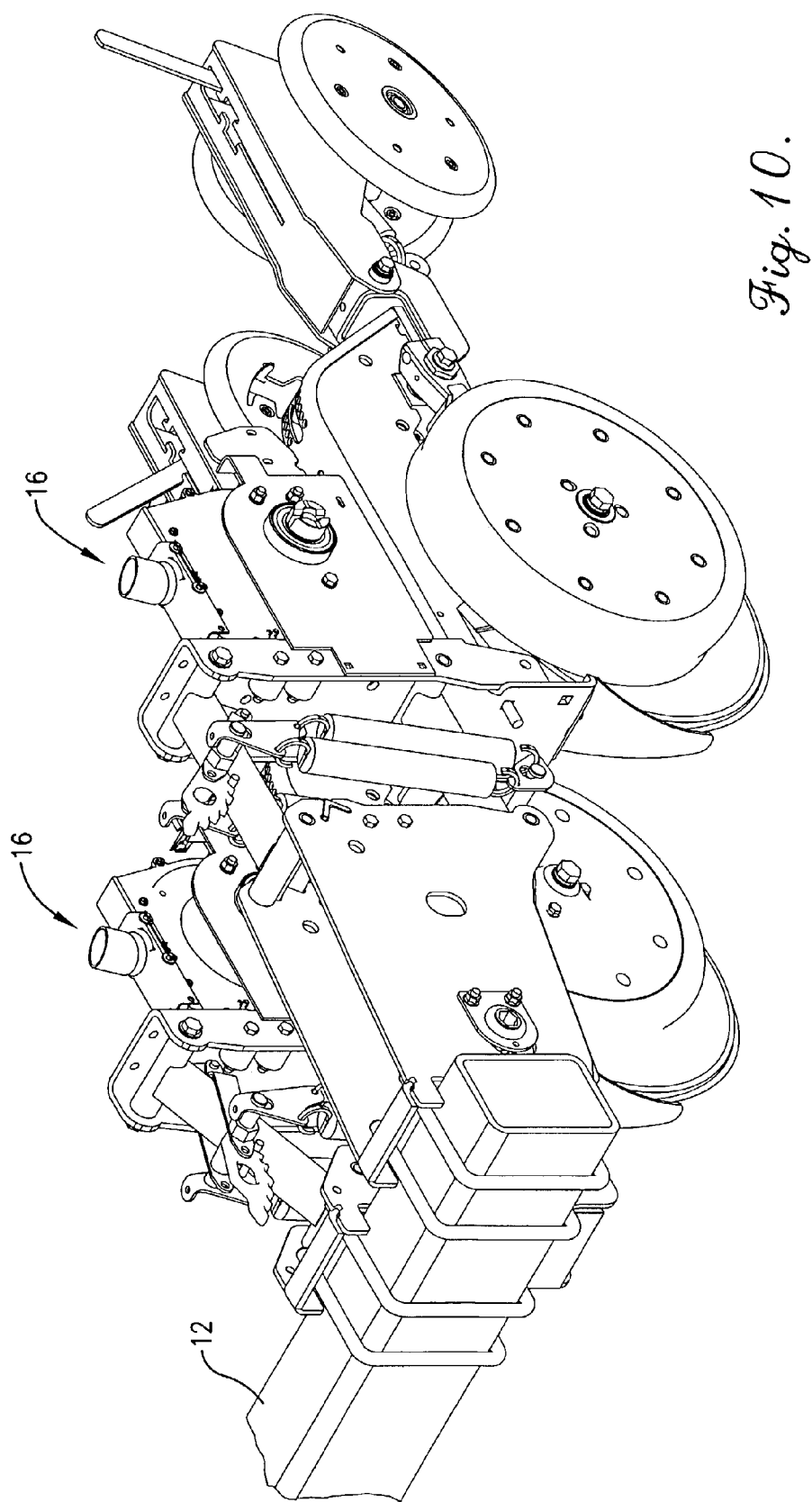
FIG. 10 is an enlarged, fragmentary isometric view of the machine illustrating a pair of typical openers.

Turning now descriptively to the drawings, FIG. 1 shows a machine 10 such as a planter having a mobile frame 12 that adapts the planter for movement along the ground, the frame 12 including a pull tongue 14 that provides for hitching of the planter to a towing tractor (not shown). A number of openers 16 (FIG. 10), commonly referred to in the art as "rows", are secured to frame 12 for placing seeds in the ground as the planter is advanced. In the illustrated embodiment frame 12 includes a rear portion 18 having enlarged, load-supporting ground wheels 20 suitable for supporting a fully loaded standard shipping container 22 of seeds that serves as a common source of supply for the rows 16. Although an exemplary planter has been illustrated by way of example, it is apparent that the principles of the present invention are not limited to any particular type of planter or openers. Further, although planter 10 illustrated herein is adapted for receiving only one container 22 at a time, it will be appreciated that planter 10 could be designed to receive multiple containers 22 at the same time and provided with corresponding multiple standardized receivers or a common standardized receiver for all containers.

Figure 9:
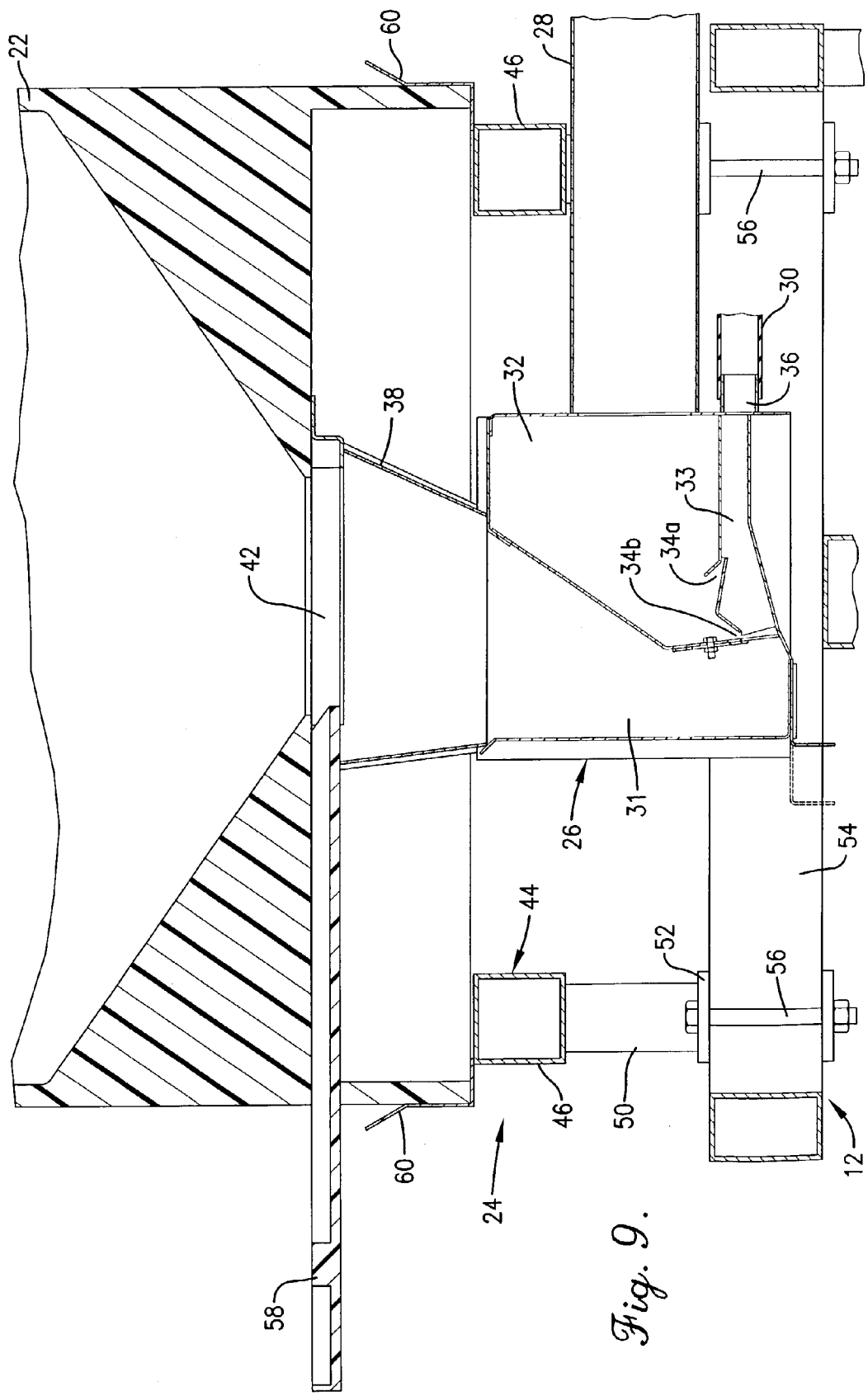
FIG. 9 is an enlarged cross-sectional view of the machine illustrating the relationship between the container and distribution manifold when the container is located on the receiver.

Rear frame portion 18 supports a standardized receiver 24 for bulk seed containers. Delivery mechanism, including a manifold 26 (FIGS. 3–9), is operably associated with receiver 24 for transporting seeds supplied by container 22 to the individual rows 16. Although the delivery mechanism may take a variety of different forms, in the illustrated embodiment the mechanism includes the manifold 26, a fan 28, and hoses 30 (FIG. 9) leading to rows 16. As shown in FIG. 9, manifold 26 may include an internal seed chamber 31, an air plenum 32 that receives positive pressure air from fan 28, and multiple horizontal passages 33 communicating with and leading from seed chamber 31. Each passage 33 has inlet orifices 34a and 34b through which air from plenum 32 may enter the passage so as to draw seeds from chamber 31 into the passage. Outlet pipe fixtures 36 on the outside of manifold 26 communicate with passages 33 and serve as fittings to secure hoses 30 to manifold 26. Air exhaust vents (not shown) associated with the rows 16 allow conveying air to escape from the system when the vents are not covered by a pool of seeds at the row. Such an arrangement can thereby serve as an on demand supply system wherein additional seeds from chamber 31 only become sucked into the entry end of the system when the level of the seed pool at the row drops below the associated vent to unblock that vent and allow a conveying air stream to move through the line.

An inlet 38 of the manifold 26 is on the top surface 40 of the manifold and aligned with the slidegate outlet opening 42 (FIG. 9) of the shipping container 22. The receiver 24 mounts to the planter frame portion 18 above the manifold 26 and conforms to the general dimensions of the bottom of a shipping container such as container 22. The receiver 24 is constructed in such a manner that a standardized shipping container such as container 22 will rest securely on the planter frame 12 while the planter is drawn through the field in the seeding process.

The receiver 24 includes a frame 44 that is of sufficient integrity to support the weight of a loaded container. Frame 44 includes four horizontally disposed, rigidly interconnected, tubular frame members 46 intersecting one another at right angles and arranged in a rectangular manner to define a central open region 48 that generally surrounds inlet 38 of manifold 26 and provides space for communication between container 22 and manifold 26. Frame 44 further includes four short, upright legs 50 at the four corners of the frame that support members 46. Legs 50 have transverse mounting plates 52 at their lower ends that facilitate attachment of frame 44 to horizontal beams 54 of rear frame portion 18 via bolt and plate assemblies 56.

The shipping containers such as container 22 commonly employ a slidegate 58 (FIG. 9) or some other suitable method in the bottom of the container to control the release of the contents of the container. The containers generally are constructed with sloping sides in the bottom of the container in the fashion of a funnel to direct the flow of the contents through the outlet opening 42 when opened by slidegate 58 and thus out of the container in a concentrated, controlled flow that can be confined to a specific dimension. The receiver frame 44 is fitted with appropriate guide structure in the form of upstanding, generally L-shaped corner brackets 60 to insure proper alignment as the container is loaded and unloaded from the receiver frame 44. Brackets 60 serve as appropriate constraints to align the shipping container outlet opening 42 to discharge the contents of the shipping container directly into the inlet 38 of the manifold 26. The receiver 24 is positioned directly above the pneumatic transfer system so as to allow seed from the container to fall by gravity directly into the distribution manifold 26. Once a container has been selected from a group of interchangeable containers and loaded onto the receiver frame, the slidegate 58 is opened to discharge the contents of the container into the manifold 26.

The receiver 24 may be provided with proper seals and cushions so as to prevent seed loss as seed transitions from the container to the pneumatic seed transfer system that moves seed from the central manifold 26 to individual rows 16. Possible variations could allow for methods for switching varieties of seed or splitting varieties of seed for distribution to various rows to achieve alternate agronomies benefits. Additionally, the present invention utilizes an air delivery seed distribution method from the shipping container to the row, but conceivably other means of distributing the seed could be employed.

Guiding structures in the form of the corner brackets 60 insure correct alignment as a container is added to or removed from the receiver 24. Structural members 46 of the receiver 24 are positioned to avoid interference as seed is discharged from the container into the manifold 26. The receiver 24 can be fabricated to accommodate any given shipping container. The receiver can be fashioned to accomodate non-standard shapes and sizes of containers.

Standardized shipping containers are gaining acceptance in the farming industry as a means of moving seed and other materials in bulk to facilitate greater efficiency in handling just as industries outside of agriculture have adopted bulk handling methods. The principle component of the system is the standardized receiver 24 for bulk shipping containers. The shipping container can be used as an independant hopper and remain on the frame of the planter, and filled using paper bags. Or the container can be loaded onto or removed from the planter frame by some mechanical means, such as a forklift. Containers from various manufacturers are being introduced into the market, but most conform to a standard dimension. Standardized shipping containers are available from various manufacturers. Typically they are contructed of rigid plastic. However, their function is independant of their fabrication. The primary consideration in selection of shipping containers is the position and alignment of the discharge opening in the bottom of the container. The construction of the container does not require the container to maintain a positive air pressure. Therefore, the container does not require a sealed cover or openings. The shape or volume on the container is not critical to the performance of the system. Volumes are thus subject to the requirement of the task. Non-standard containers may be substituted for standard containers as the requirements of the task dictate.

Alternatively, a non-standard container could be substituted for a standard container so long as the interface between the receiver and the manifold are compatible. This provision would allow for containers of larger capacity than standardized containers, or would allow for containers with special purposes such as split variety application. Additionally, the contents remaining in the system after a given load is planted out can be blown out with the fan system for quick and efficient cleanout. Further advantages can be gained from installing a "Y" splitter at the terminal end of the distribution hoses to multiply the number of rows that can be serviced from a given manifold system. This in effect implements a split-row planter configuration.

It is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. In a pull-type planter for placing materials into the ground, the improvement comprising:
    a plurality of openers for depositing materials into the ground as the planter is pulled by a towing vehicle over ground to be planted;
    delivery mechanism for delivering materials to the openers from a common source of supply;
    a plurality of interchangeable bulk materials shipping containers each filled with a supply of materials,
    each of said shipping containers having an outlet and a shiftable gate normally closing said outlet to confine materials within the container while the materials are being shipped; and
    a mobile frame including a towing tongue adapted for connecting the planter to the towing vehicle,
    said frame further including a standardized receiver adapted to interchangeably receive a selected one of said plurality of filled shipping containers and position the same to discharge materials into the mechanism for distribution to the openers,
    said delivery mechanism including an inlet mounted on said frame and positioned to receive materials from the outlet of a shipping container on the receiver when said gate is shifted to open the outlet,
    each of said shipping containers further having a lowermost supporting extremity spaced below and outboard of said outlet for supporting engagement with the receiver when a filled shipping container is placed thereon and for positioning the outlet of the shipping container in alignment with the inlet of the delivery mechanism.

2. In a planter as claimed in claim 1, said receiver including locating structure for engaging side portions of the container.

3. In a planter as claimed in claim 2, said support frame having a plurality of intersecting frame members that cooperate to define a central open region through which the container communicates with the delivery mechanism, said locating structure projecting upwardly from said frame.

4. In a planter as claimed in claim 3, said structure comprising upright, generally L-shaped corner brackets configured to generally matingly receive and confine corresponding corners of the container.

5. In a planter as claimed in claim 1, said delivery mechanism being operable to deliver materials using positive pressure air streams.

6. A method of planting comprising the steps of:
obtaining a supply of planting materials in a shipping container;
placing the shipping container containing the supply of planting materials on a pull-type planter;
pulling the planter with a towing vehicle over ground to be planted while the shipping container is carried by the planter;

as the planter carries the shipping container over ground to be planted, delivering the planting materials from the shipping container to ground-engaging openers on the planter that move with the shipping container during its travel over the ground to be planted; and as materials are being delivered to the openers from the shipping container, placing materials from the shipping container into the ground using the openers.

7. A method as claimed in claim 6, said delivering step including discharging materials from the bottom of the container.

8. A method as claimed in claim 7, said delivering step further including conveying materials to the openers using positive pressure air streams.

9. A method as claimed in claim 6, said delivering step including conveying materials to the openers using positive pressure air streams.

10. A method as claimed in claim 6, further comprising the steps of removing the shipping container from the planter, replacing the container with a different shipping container having a supply of planting materials therein, and delivering materials from said different shipping container to the ground-engaging openers as the planter transports said different shipping container over the ground.

11. A method as claimed in claim 6, said openers being mounted on one wheeled portion of the planter and said shipping container being mounted on another wheeled portion of the planter.

* * * * *